Aug. 7, 1951
M. WINTERHALTER
2,563,767
SLIDE FASTENER
Filed Feb. 9, 1945
2 Sheets-Sheet 1
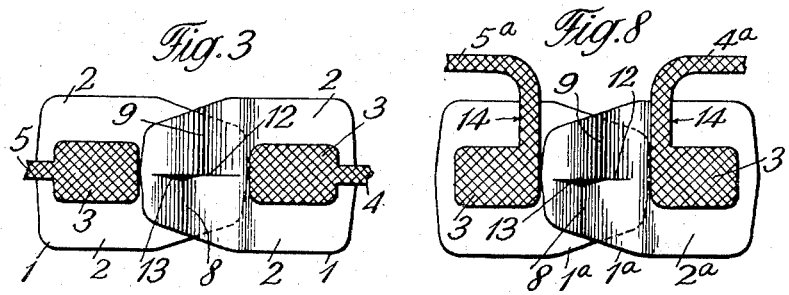
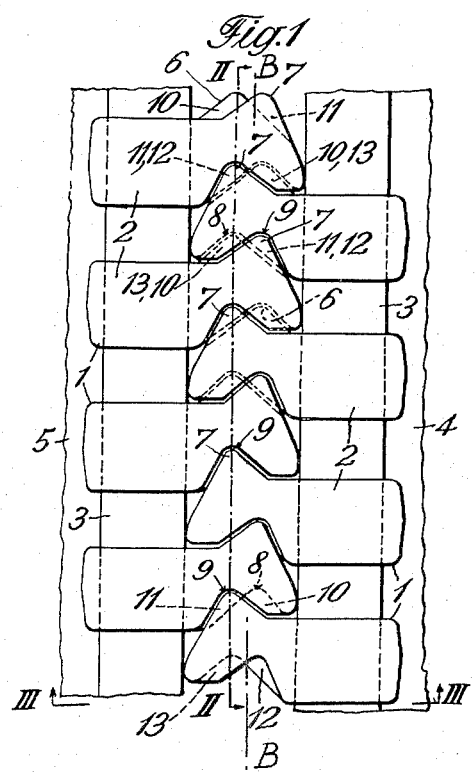
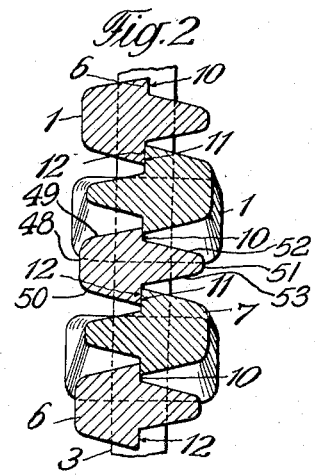
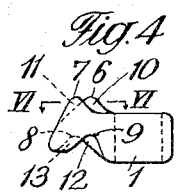
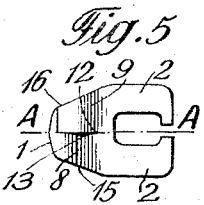
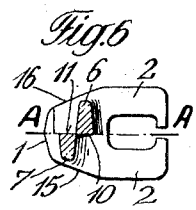
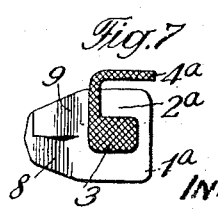
INVENTOR:
MARTIN WINTERHALTER
By Emery Booth Townsend Miller & Weidner
ATTYS Aug. 7, 1951  M. WINTERHALTER  2,563,767
SLIDE FASTENER
Filed Feb. 9, 1945  2 Sheets-Sheet 2
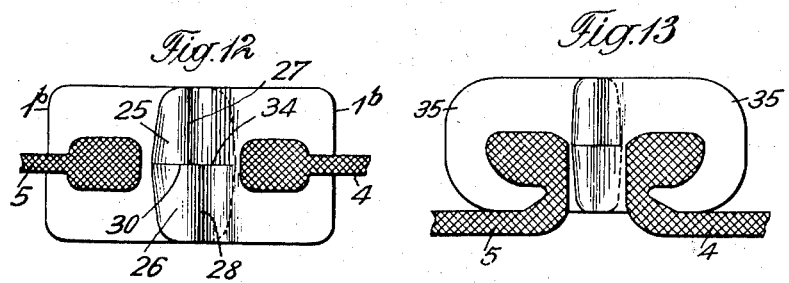
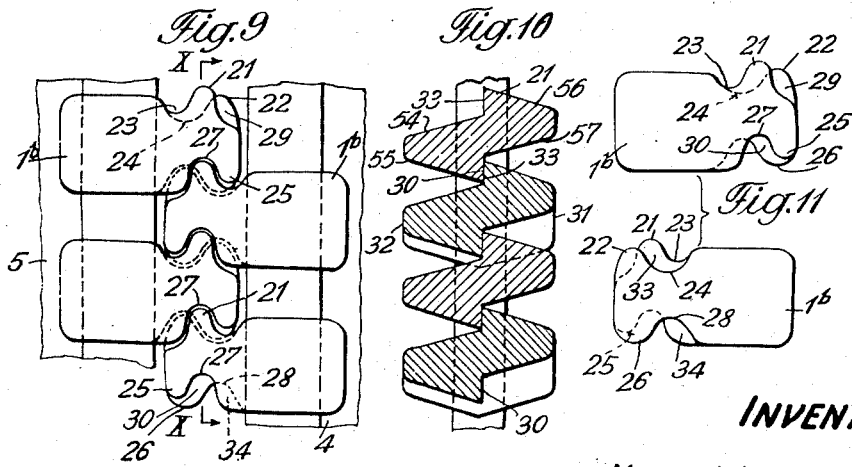
INVENTOR:
MARTIN WINTERHALTER.

Patented Aug. 7, 1951

2,563,767

UNITED STATES PATENT OFFICE 2,563,767

SLIDE FASTENER

Martin Winterhalter, Morcote, Tessin, Switzerland

Application February 9, 1945, Serial No. 577,063
In Switzerland June 19, 1943

Section 1, Public Law 690, August 8, 1946
Patent expires June 19, 1963

6 Claims. (Cl. 24—205.13)

This invention relates to slide fasteners having molded fastener elements, and more particularly to fasteners of the type in which the fastener elements are directly molded on and intimately united to opposite sides of a pair of stringers.

In my U. S. Patent No. 2,239,803 I have described molded fastener elements which are provided with a coupling projection and a coupling recess, the latter having a bottom wall disposed at one side of the element in a plane parallel with the stringers, and being open on the opposite side of the element, in order to permit molding of an entire length of stringer in a single operation in a mold formed of two parts. Said bottom wall of the recess in one element prevents the coupling projection of the successive element engaged therein from laterally sliding out of the recess in one direction only, while the coupling projection could slide out of the recess in the opposite lateral direction.

There are also known molded fastener elements in which the recess engaging the coupling projection is closed around its entire circumference, similar to the usual punched elements, so as to prevent any lateral displacement of the projection engaged in the recess, but in this case it is possible only to mold single fastener members and a three piece mold is required for casting such elements; molds in three pieces however are complicated and difficult to render tight, and successive casting of single elements of a stringer means loss of time.

It is an object of the present invention to provide fastener stringers with molded fastener elements in which the coupling projections and the corresponding coupling grooves are formed with locking surfaces disposed intermediate the length of the projections and grooves, and engaging with each other when the fastener elements are coupled to mutually lock the elements against movement transversely to the stringers while nevertheless it is possible to cast the elements in a two piece mold and in a single operation for any desired length of stringer.

A further object of the invention is the provision of fastener elements which are each formed with a plurality of locking surfaces extending substantially parallel with the stringers, the locking surfaces of each two coupled elements coacting with each other to prevent lateral movement of the elements in both directions at right angles to the stringers.

The novel features of the invention will appear from the following description taken in conjunction with the accompanying drawing showing preferred embodiments of the invention.

Fig. 1 is a fragmentary plan view of a slide fastener embodying my invention;

Fig. 2 is a section according to line II—II of Fig. 1;

Fig. 3 is a section according to line III—III of Fig. 1;

Fig. 4 shows a fastener element in lateral elevation;

Fig. 5 shows a fastener element in plan view;

Fig. 6 shows a fastener element in section according to line VI—VI of Fig. 4;

Fig. 7 shows a modified fastener element in plan view;

Fig. 8 shows two coupled fastener elements according to Fig. 7, in a section similar to Fig. 3.

Fig. 9 is a plan view of a portion of a slide fastener according to a further modification.

Fig. 10 is a section along the line X—X of Fig. 9.

Fig. 11 shows a fastener element from the front and from the rear side.

Fig. 12 is a section through the two tapes of the fastener showing two coupled elements.

Fig. 13 is a similar sectional view of a fastener having modified fastener elements.

The represented slide fastener comprises two stringer tapes 4 and 5 each having an edge bead 3 to which are applied by means of their jaws 2 the fastener elements 1. These elements are molded on and intimately united to opposite sides of the stringers by die-casting directly on the tapes 4 and 5. The coupling members of the fastener elements 1 are formed as cooperating transverse projecting ribs or male coupling members and transverse grooves or female coupling members; each fastener element comprises on one face two transverse ribs 6 and 7 and on the opposite face two transverse grooves 8 and 9 engaging with the transverse projecting ribs of the adjacent opposite element. The two ribs 6 and 7, and the two grooves 8 and 9 are displaced relatively to one another in longitudinal direction with respect to the element. In transverse or lateral direction the rib 6 and the groove 8 extend from one lateral face of the element to a plane A—A parallel with the stringers and passing substantially through the center of an element, and the other rib 7 and groove 9 extend from the opposite lateral face of the element to the central plane A—A (Figs. 5 and 6). In this manner the end face of the rib 6 intermediate the width of an element forms a surface 10 and the end face of the rib 7 intermediate the width of an element forms a surface 11; both surfaces 10 and 11 extend substantially parallel with the stringers and face towards opposite sides. Similarly, the bottom of the groove 8 intermediate the width of an element forms a surface 13 and the bottom of the groove 9 intermediate the width of the element forms a surface 12; both surfaces 12 and 13 extend substantially parallel with the stringers and are also facing towards opposite sides.

As is visible from Fig. 1, when the fastener elements of the two stringers are coupled with each other by means of any conventional slider, the rib 6 of one element engages with the groove 8 of the other element, and the rib 7 of the first element engages with the groove 9 of the other element. At the same time the end surfaces 10 and 11 of the ribs 6 and 7 of one element engage with the bottom surfaces 13 and 12, respectively, of the other element. Thus, in the closed slide fastener, the opposite fastener elements are prevented from being separated in the plane of the stringers by the projecting ribs 6 and 7 engaged in the grooves 8 and 9, in the manner of ordinary slide fasteners except that there are two projections and two recesses coupled with each other for each single element instead of the usual single projection engaging a corresponding socket, but besides the interlocking ribs and grooves, two successive fastener elements are further coupled by the co-operating surfaces 10, 13 and 11, 12, which prevent any lateral displacement of the coupled element in both directions at right angles to the stringers for the reason that the surface 10 of one element extends under the surface 13 of the adjacent engaged element, and the surface 11 of the first element extends over the surface 12 of the adjacent element. Since the coupling grooves 8, 9 of the elements are open towards one side of the elements, casting of the elements in a simple two piece mold is possible without use of a core.

Instead of disposing the locking surfaces 10, 13 and 11, 12 in the central plane A—A of the width of the elements these surfaces could also be displaced from the center towards one or the other of the lateral faces of the elements.

It results from Fig. 1 that when the slide fastener is closed one of the two projecting ribs 6 and 7 and the corresponding groove 8 or 9 of each fastener element are situated at one side of the longitudinal central axis B—B of the coupled stringers, while the other projecting rib and the corresponding groove are situated on the other side of this axis. The points of engagement formed by the corresponding ribs and grooves of adjacent coupled elements of the slide fastener are thus situated on two longitudinal axes which according to Fig. 1 extend on either side of the longitudinal central axis B—B of the stringers.

The modification according to Figs. 7 and 8 distinguishes from the previously described example only by the fact that the jaws 2ª are so shaped that the stringer tapes 4ª and 5ª are not passed out of the elements 1ª through the rear ends thereof as in Fig. 3, but through a lateral slot 14, so that the fastener elements are partly covered by the stringer tapes, when the stringers are attached to an article of use to be closed by the fastener.

The fastener elements 1ᵇ of the slide fastener according to Figs. 9 to 11 are also directly die-cast on the tapes 4 and 5. The elements 1 are provided with a coupling head having at opposite sides thereof coupling ribs and coupling grooves. Two parallel ribs 21 and 22 and two parallel grooves 23 and 24 are formed at one side of the coupling head, while two parallel ribs 25 and 26 and two parallel grooves 27 and 28 are formed on the other side of the coupling head. Each coupling head is provided with two locking surfaces 29 and 30 extending substantially parallel with the common plane of the two tapes or stringers 4 and 5 and substantially in the middle between the two opposite side faces 31 and 32 of the elements. Each coupling head is further provided with two further locking surfaces 33 and 34 also extending substantially parallel with the common plane of the two tapes 4 and 5 and in the middle between the opposite side faces 31 and 32 of the elements. The various coupling ribs and grooves of the fastener elements 1 extend each over substantially the half of the width of the element from one or the other of the side faces 31 and 32 to one of the locking surfaces 29, 30, 33 or 34. Thus the rib 21 extends from the side face 31 of an element to the locking surface 33, while the groove 24 extends from this locking surface to the opposite side face 32 of the element. The rib 22 extends from the side face 32 to the locking surface 29. The rib 26 extends from the side face 32 to the locking surface 30 and the groove 27 extends from this locking surface to the side face 31 of the element. The groove 28 extends from the side face 32 of the element to the locking surface 34.

When the fastener elements are coupled by the usual slider the ribs 21 and 22 of a fastener element engage the grooves 27 and 28 of one adjacent element, and the ribs 25 and 26 of the element engage the grooves 23 and 24 of the other adjacent element. These coupled ribs and grooves prevent a separation of the two fastener stringers by efforts acting in the plane of the stringers and which tend to pull the two stringers away from each other. When the elements are coupled, the locking surface 29 of one element slides over the locking surface 34 of the adjacent element, while the locking surface 33 of one element slides over the locking surface 30 of the adjacent element. These locking surfaces which extend transversely to the ribs and grooves engage each other so as to prevent lateral displacement of each two coupled elements relatively to each other in both directions transversely to the common plane of the two fastener stringers. Since the coupling grooves 23, 24, 27 and 28 are open towards one or the other of the lateral surfaces 31 and 32 of the fastener element, these elements can be die-cast in a simple two-part die, permitting thus the whole length of a fastener stringer to be cast in a single casting operation. The locking surfaces 29, 30, 33 or 34 are situated in a single plane substantially in the middle between the side faces 31 and 32 of the elements, and the coupling ribs and grooves extend from these locking surfaces to the outer side faces 31 and 32, so that the entire width of the coupling heads of the elements is utilized for producing the coupling between two elements.

In the example shown in Fig. 13 the coupling head 35 of the fastener elements is formed in the same manner as in Figs. 9 to 12. However, the tapes 4 and 5 are not passed out of the elements through the opposed rear ends thereof, but at one side of the elements so that when the slide fastener is attached to an article of use the coupling heads only are visible while the jaws are covered by the tapes.

In the several modifications of the invention illustrated the faces of the fastener element heads are shown as convergingly tapered toward the opposite sides of said heads from the inner end surfaces of the several ribs and grooves on and in those faces. For example, the opposite faces of the heads of the fastener elements of Figs. 1 to 7 are, as shown in Fig. 2, tapered from the inner end surfaces of the ribs and grooves toward the opposite faces 48 and 51 of the fastener heads to provide, on the fastener element heads of one stringer, the converging surfaces 48 and 49, and, on the fastener element heads of the other stringer, the converging surfaces 52 and 53. Similarly, as clearly shown by Fig. 10, the faces of the fastener element heads of the other modification illustrated are tapered in the same way as indicated at 54 and 55, and at 56 and 57. So forming the heads permits the interlocked stringers to be readily bent transverse to the plane of the stringers about points on the inner end surfaces of the projections and recesses as, for example, the surfaces 10, 11, 12 and 13 of Figs. 1 and 2 and the corresponding surfaces 29, 30, 33 and 34 of Figs. 9 and 10. Were the faces of the heads not tapered, that is to say, were they parallel with each other, bending of the interlocked stringers transverse to the plane of the stringers would cause any excess bending to uncouple the fastener elements, because such bending would cause the corners between the faces and sides of adjacent heads to contact at the concave side of the rows of heads, and that, upon excess bending, would move the inner end surfaces of the grooves and projections out of cooperation.

It will be understood that while I have illustrated and described a certain preferred form of fastener stringers, my invention is not limited to the specific construction herein disclosed and changes and modifications may be made within the scope of the appended claims without departing from the spirit of my invention.

I claim:

1. A separable slide fastener having a pair of stringers each provided with a row of fastener elements, the latter having interlocking heads each formed to present on one face thereof a pair of longitudinally and transversely spaced projections, and, on the opposite face, a pair of longitudinally and transversely spaced depressions; one of said projections and one of said depressions of each head extending inwardly from one of the sides of the head, and the other projection and depression extending inwardly from its opposite side, and all terminating in a common plane intermediate said sides; those projections of the heads of the fastener elements of each stringer which are adjacent the free ends of said heads, and those depressions of said heads which are remote from said free ends, being all at the same side of the two stringers, while the other projections and depressions are all at the opposite side of the two stringers.

2. A separable slide fastener having a pair of stringers each provided with a row of fastener elements, the latter having interlocking heads each formed to present on one face thereof a recess operatively extending from one side to the opposite side of the head, and, on the same face, a pair of projections between said recess and the free end of the head, which projections are longitudinally spaced with respect to said head and extend inwardly from opposite sides, respectively, of the head to a common plane intermediate said sides, in which plane they have end surfaces; said heads each being also formed to present, on the opposite face thereof, a projection adapted to be received in the aforesaid recess presented by the adjacent fastener element, and, on the same face as the last mentioned projection, a pair of recesses adapted to receive the aforesaid pair of projections presented by said adjacent fastener element, which last mentioned recesses extend inwardly from opposite sides, respectively, of the head and terminate in the same intermediate plane as said pair of projections and have end surfaces in said plane; said pair of projections and pair of recesses being so disposed that their said end surfaces cooperate, when the rows of fastener elements are interlocked, to prevent separation of said rows in each of opposite directions normal to the plane of the stringers, while permitting bending of the fastener elements of each row relative to those of the other row in one direction transverse to that plane and the widths of the stringers.

3. A separable slide fastener having a pair of stringers each provided with a row of fastener elements, the latter having interlocking heads each formed to present on one face thereof adjacent its free end a first projection, and, contiguous with said projection at its side opposite said free end, a first recess, which projection and recess both extend from from one side of the head to a common plane intermediate its sides; each head being formed also to present, on the same face as said first projection and first recess, a second projection, the latter extending inwardly from the opposite side of the head from said first projection and first recess to said plane in overlapping relation with both said first projection and said first recess, and further on the same face, a second recess and a third recess at each of opposite sides, respectively, of said second projection and contiguous therewith, which second and third recess both extend inwardly from the same side of said head as said second projection to said plane, the second recess being opposite the first projection and opening on the free end of the head and the third recess opening into the first recess; each head also being formed to present, on its opposite face, a third projection positioned opposite said second recess for reception by the aforesaid third recess presented by an adjacent head, a fourth recess opposite said second projection for receiving the second projection presented by an adjacent head, a fourth projection opposite said first projection for reception by the first recess presented by an adjacent head, and a fifth recess for receiving the first projection presented by an adjacent head, said third and fourth projections and fourth and fifth recesses extending inwardly from the sides of the head to said plane.

4. A separable slide fastener according to claim 1 in which the heads of the fastener elements are convergingly tapered from the plane of the end surfaces of the projections and recesses toward each of the opposite sides of the heads for permitting bending of the interlocked stringers transverse to said plane and the length of the stringers about points on said end surfaces.

5. A separable slide fastener according to claim 2 in which the heads of the fastener elements are convergingly tapered from the plane of the end surfaces of the projections and recesses toward each of the opposite sides of the heads for permitting bending of the interlocked stringers transverse to said plane and the lengths of the stringers about points on said end surfaces.

6. A separable slide fastener according to claim 3 in which the heads of the fastener elements are convergingly tapered from the plane of the end surfaces of the projections and recesses toward each of the opposite sides of the heads for permitting bending of the interlocked stringers transverse to said plane and the lengths of the stringers about points on said end surfaces.

MARTIN WINTERHALTER.

REFERENCES CITED

The following references are of record in the file of this patent:

UNITED STATES PATENTS

| Number | Name | Date |
|---|---|---|
| 2,322,537 | Morin | June 22, 1943 |
| 2,355,996 | Morin | Aug. 15, 1944 |
| 2,361,782 | Low | Oct. 31, 1944 |
| 2,394,211 | Siff | Feb. 5, 1946 |

FOREIGN PATENTS

| Number | Country | Date |
|---|---|---|
| 470,958 | Great Britain | of 1937 |